Figure 1:
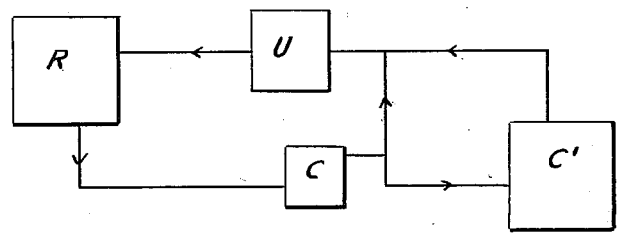

Oct. 12, 1943.   L. P. SHARPLES   2,331,352
CENTRIFUGAL SEPARATOR AND PROCESS
Filed May 21, 1941   3 Sheets-Sheet 1

INVENTOR
Laurence P. Sharples
BY
Maurice A. Crews
ATTORNEY

Oct. 12, 1943.　　　L. P. SHARPLES　　　2,331,352
CENTRIFUGAL SEPARATOR AND PROCESS
Filed May 21, 1941　　　3 Sheets-Sheet 2

INVENTOR
Laurence P. Sharples
BY
Maurice A. Crews
ATTORNEY

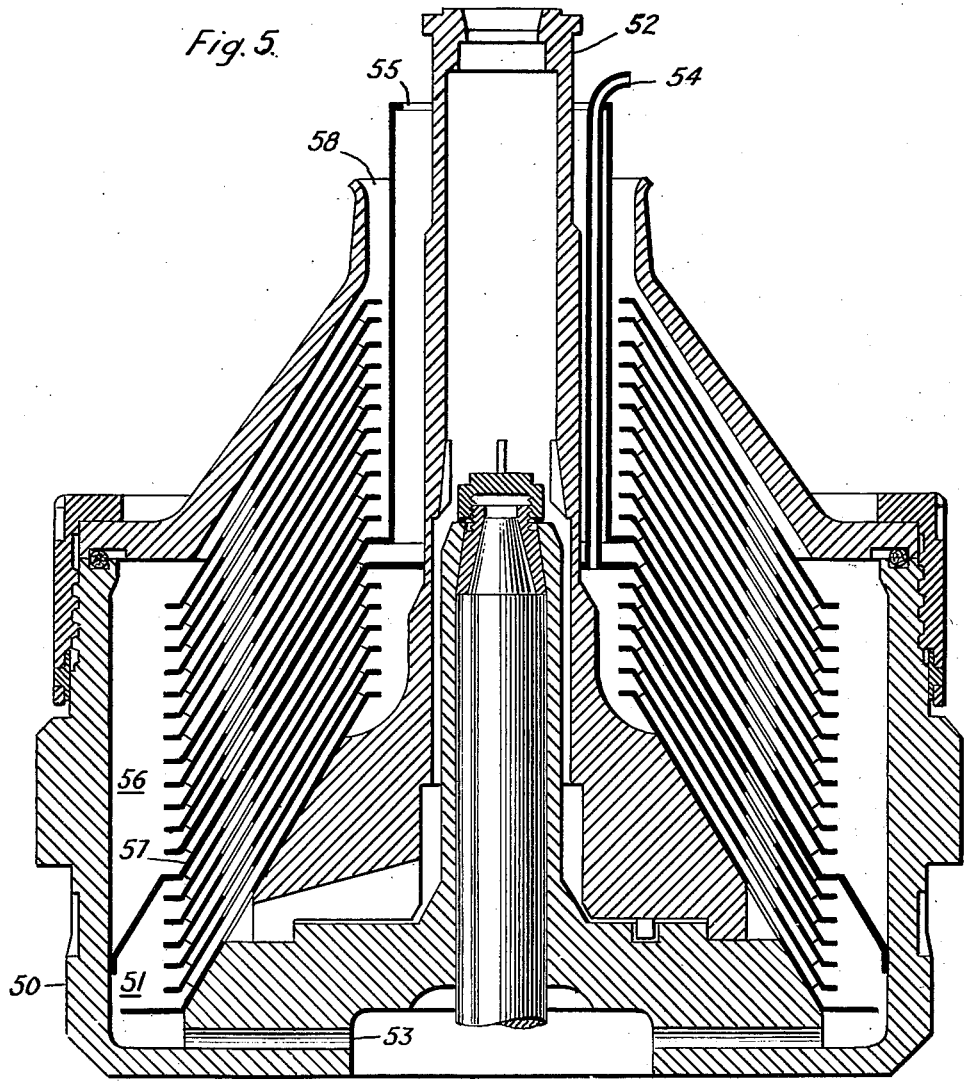

Patented Oct. 12, 1943

2,331,352

UNITED STATES PATENT OFFICE 2,331,352

CENTRIFUGAL SEPARATOR AND PROCESS

Laurence Price Sharples, Ardmore, Pa., assignor to The Sharples Corporation, Philadelphia, Pa., a corporation of Delaware Application May 21, 1941, Serial No. 394,477

15 Claims. (Cl. 233—17)

The present invention pertains to the art of centrifugation. It includes a novel centrifugal process, and novel centrifugal apparatus for carrying out this and similar processes. The process and machine of the invention are particularly valuable in connection with purification of liquids which have become contaminated in use, such as lubricating oils which may become contaminated with liquid and solid impurities of varying size and specific gravity.

As taught by Stokes law, the rate of sedimentation of a particle of liquid or solid existing in a continuous liquid phase as an impurity is dependent upon the specific gravity difference between the particle to be separated and the continuous liquid phase, and upon the size of the particle. If a given particle is not removed in a single step of centrifugation, it will not ordinarily be removed even by a repetition of that step. If the liquid under treatment contains impurities which are unusually difficult to remove because of size or specific gravity, it may become necessary to resort to intensive centrifugation; i. e., to apply very high centrifugal force, or to apply a lower centrifugal force in a prolonged operation of centrifugation, in order to remove impurities of these types. If this result is accomplished by reducing the rate of flow of the contaminated liquid through any given centrifugal separator, the total quantity of liquid which may be purified in a given time is reduced, with the result that the economics of use of the machine are not so favorable as they would be if the throughput were more rapid.

As an illustration of the above, we may consider the problem of removal of solid impurities from used lubricating oil by passage of the used oil through the centrifugal separator at high throughput rates. The centrifugal removes the coarser and heavier impurities but does not remove the finer impurities. When the oil is returned from the centrifugal to the engine for re-use, it accumulates further coarse and fine impurities during use prior to being recentrifuged. In this next step of centrifugation, the coarser impurities are again removed, but the amount of finer impurities discharged from the centrifugal rotor with the oil after this second centrifugal purification treatment is even larger than before, and ultimately reaches a point at which the oil should be discarded, or subjected to some different type of purification treatment.

The present invention provides a novel process by which the more easily removable (e. g., coarser and heavier) impurities are removed from a large flow of the liquid, but in which the finer impurities are removed from a lesser flow of the liquid (and usually a minor part) during each such operation. This is accomplished in the preferred form of the invention by dividing the rotor and directing the liquid so that a relatively large flow passes through one part of the rotor and hence remains in the rotor under centrifugal force a relatively short space of time, and a relatively small flow of liquid passes through the other part of the rotor and hence remains under centrifugal force a relatively great length of time. An additional means of providing more rigorous centrifugation for the lesser flow of liquid is to space the stratifying discs in that part of the rotor closer so that more rigorous centrifugation will be effected. Thus the discs with the wider spacing in the first portion of the rotor permit large particles of sediment to be removed from the liquid without jamming in the discs or in the feed holes in the discs, whereas the second part of the bowl can successfully have closer spacings since these larger particles which might jam closely spaced discs have been removed previously by passage of this liquid through the first part of the rotor. By operating in this manner we are able to avoid a progressive increase in the proportion of finer impurities subjected to repeated centrifugal purification and reuse, and so keep the proportion of such impurities within permissible limits. At the same time we avoid the additional burden of expense which would be involved in an attempted removal of all of the fine impurities from the full flow of the oil.

Figure 2:
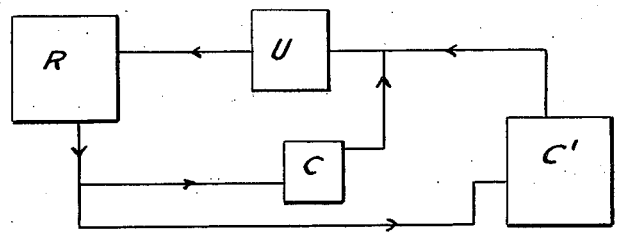
Figure 3:
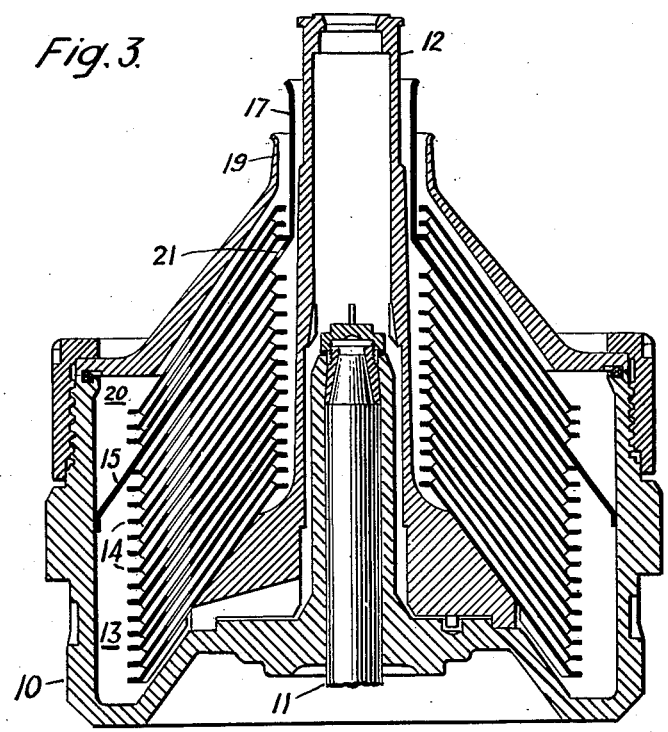
Figure 4:
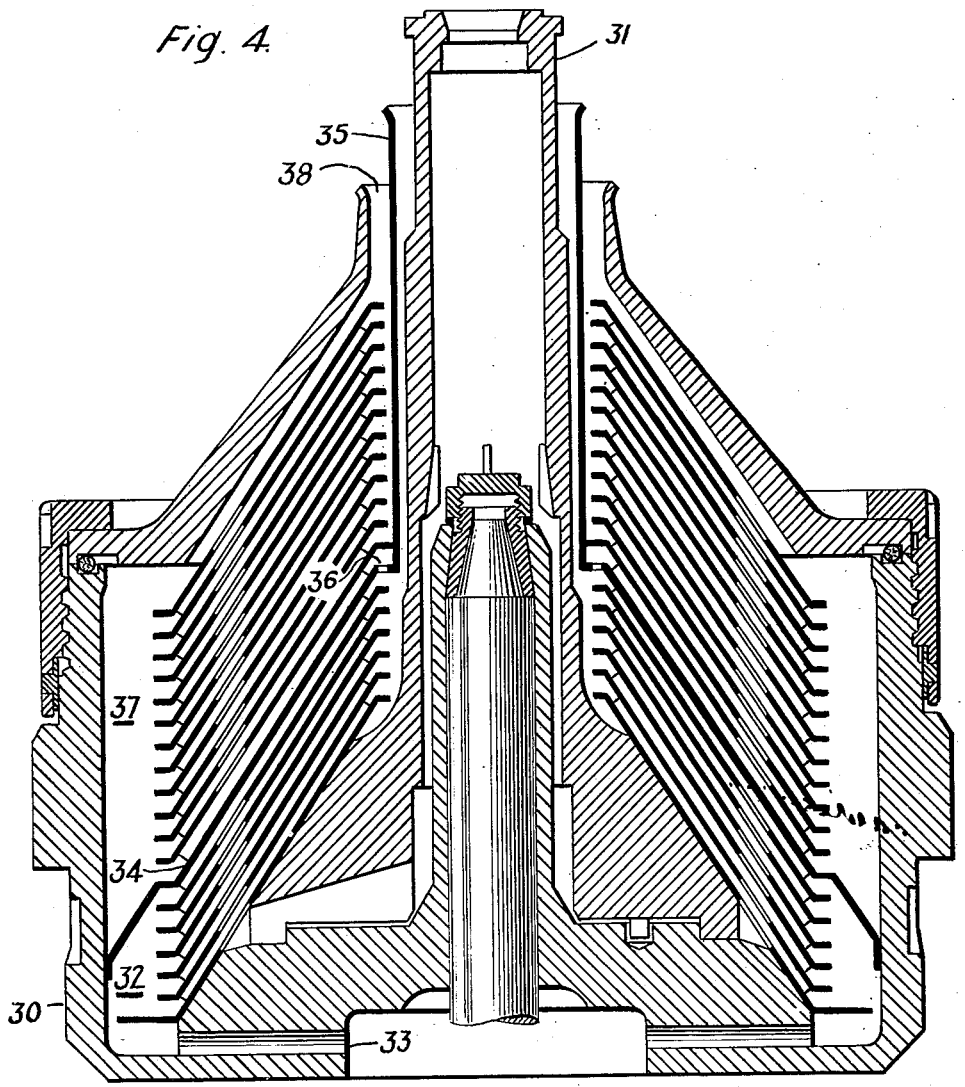

The nature of the invention will be better understood by reference to the attached drawings, in which, Figure 1 is a flow sheet illustrating the practice of the preferred process of the invention, Figure 2 is a figure similar to Figure 1, illustrating a modification, Figure 3 is a partially diagrammatic, vertical sectional view through a machine of the invention, designed to separate solids from liquids, Figure 4 is a view similar to Figure 3, illustrating a machine of the invention designed to separate both a liquid impurity and solids from an impure liquid, and Figure 5 is a view similar to Figure 3, illustrating a modification.

In the practice of the process of the invention, as illustrated in Figure 1, liquid from a source of contaminated liquid indicated by the reservoir R may be removed from that source and subjected to centrifugation in a zone of centrifugation C. This step of centrifugation is of a relatively non-rigorous character; it is designed to effect removal of coarse impurities from the liquid under treatment, but there is no attempt to separate all of the finer impurities. After performance of the partial purification step C, the body of liquid is divided, and a part of this body of liquid is subjected to a second step of centrifugation indicated by the reference character C'. This step of centrifugation is much more rigorous than the first step, an attempt being made to remove practically all of the finer impurities by retaining the liquid in the centrifugal rotor for a much longer period of time than is the case in the centrifugal separating step C. The liquids from the centrifugal separating steps C and C' are returned to a zone of use, U, after completion of the purification treatment as described above, and after being recontaminated by re-use, they may be passed again to the reservoir R for repurification.

It is usually necessary to pass only a minor part of the flow of liquid to the separating step C'. The object in the accomplishment of this step is to establish an equilibrium at a relatively high degree of purity between the quantity of finer impurities accumulating in the liquid between successive steps of recycling and the quantity of such impurities removed in the centrifugal purifying step C'. Thus, assuming for the sake of example that the liquid is an oil containing large abrasive impurities which must not pass through the bearings to be lubricated, and in addition fine particles non-abrasive in nature but undesirable in relatively large concentration, and assuming that the maximum permissible quantity of such fine impurities is 0.3%, based on the liquid and that there is an increase of 0.05% of such fine contaminating impurities in each use between successive steps of passing the liquid to the centrifugal purifying treatment, this treatment may involve passage of all of the liquid through the centrifugal purification step C of Figure 1 and 25% of the liquid through the step C'. Assuming that a thorough removal of the finer impurities occurs in step C', the quantity of finer impurities (unremovable in step C) in the total quantity of a body of fresh liquid being subjected to repeated re-use and purification will gradually increase until the quantity of such impurities reaches a figure of between 0.15 and 0.20%. After a condition is reached in which the liquid contains 0.15% of these finer impurities, when returned for reuse, and this liquid accumulates 0.05% additional finer impurities in such re-use, it will obviously contain 0.20% of such impurities upon the next passage to the centrifugal purifying system. But since 25% of the liquid is passed through the centrifugal purifying step C', and all of the finer impurities are removed from this portion of the liquid, the percentage of finer impurities removed from the total flow of liquid through the centrifugal purifying system will be 25% of 0.20%, or 0.05%; i. e., the exact percentage of finer impurities accumulated since the last purifying treatment. When this stage is reached, there will thus obviously be no further progressive increase in the proportion of finer impurities in the system. While the above arithmetic analysis illustrates the general theory of the invention, it should be understood that it is not intended as a practical example, but that it is simply an idealized case illustrating the general principle of operation.

Figure 3 of the drawings illustrates a centrifugal rotor designed for the practice of the invention in removal of solid impurities from a liquid. The centrifugal rotor 10 may be rotated by any means conventional in the art, such as the spindle 11, secured to the lower end of the rotor. Liquid to be purified enters the rotor through the centrally disposed feed tube 12, and is passed into the lower end of the lower zone of centrifugation 13. This zone may be provided with frusto-conical stratifying discs 14 to assist in the removal of impurities, as will be well understood by those skilled in the art. The more easily separable heavy impurities pass to the periphery of the rotor under the influence of centrifugal force, while the main body of the liquid, after removal of these impurities, passes to the center of the rotor, and is discharged from the rotor through the space between the outer circumference of the feed tube 12, and the axially extending portion of a partition 15 which separates the centrifugal separating zone 13 from a centrifugal separating zone 20 in the upper end of the rotor. The zone 20 may be connected with the zone 13 through restricted passages 21 formed in the partition 15. The size of these passages determines the proportion of the liquid passed to the separating zone 20. Impurities separated from the liquid in the zone 20 pass outwardly to the circumference of the rotor, while the purified liquid passes inwardly and is discharged from the rotor through the space between the outer wall of the extension 17 of the partition 15 and an axial portion 19 of the bowl neck.

The passages 21 through the partition 15 are preferably so restricted that only a small proportion of the liquid from the zone 13 passes through the partition 15 into the zone 20, the major portion of the liquid being passed inwardly between the feed tube 12 and extension 17 and discharged directly from the rotor, after being treated in the zone 13. Since only a relatively small proportion of the liquid flow enters the chamber 20, liquid entering that chamber will be retained therein for a longer time than liquid in the chamber 13, before being displaced by newly-received liquid, and being discharged from the rotor. Thus, the liquid in the chamber 20 is subjected to a more rigorous centrifugation than the liquid in the chamber 13, by being subjected to centrifugal force for a longer period of time.

It is desirable that all of the liquid subjected to purification be freed of larger impurities, and this function is accomplished in the zone 13. It is not necessary that all of the finer impurities be removed, but it is necessary that a sufficient proportion of such impurities be removed to avoid progressive indefinite increase in the quantity of said impurities in successive cycles of re-use, and re-centrifugation of the liquid. Thus, a sufficient proportion of the liquid from the zone 13 is passed to the zone 20 to establish an equilibrium at a high degree of purity; i. e., to effect, by more rigorous centrifugation in the zone 20, removal of a quantity of the finer impurities from this liquid which is at least as great as the accumulation of these finer impurities in the total flow of liquid passed to the centrifugal rotor 10 since the last previous centrifugation of this liquid prior to re-use of the liquid. The two streams or bodies of liquid discharged from the zones 13 and 20, respectively, may be recombined for further use, as indicated by Figure 1 of the drawings.

Figure 4 of the drawings illustrates a centrifugal separator designed to effect removal of a relatively easily removable liquid impurity in an initial zone of separation, and thereafter to effect removal of a more difficultly removable impurity which may be a liquid or solid impurity, from a portion of the liquid under treatment. The rotor 30 is provided with a central feed tube 31, which directs the liquid under treatment into a zone of centrifugation 32 in the lower end of the rotor. The heavier, liquid, impurity, after removal from the liquid being subjected to the purifying treatment, is discharged from the rotor through passages 33 in the base thereof. The major portion of the flow of liquid under treatment, which has been partially purified as discussed above, is discharged from the rotor through the space between the feed tube 31 and the extension 35 of a partition 34, which divides the rotor into successive zones of centrifugation. A minor proportion of the flow of liquid is passed through spaces 36 in the partition 34 to a secondary zone of centrifugation, in which the liquid is subjected to more prolonged purifying treatment, to effect removal of finer impurities therefrom. The more thoroughly purified liquid is discharged from the zone 37 through a passage 38 between the upper end of the main body of the rotor, and the extension 35 of the partition 34. From the discussion of Figure 3 of the drawings, it will be evident that the construction of Figure 4 affords analogous advantages, in that the more easily removable impurities are removed from all of the liquid under treatment in the zone 32, while the more difficultly removable impurities are removed from a part of this liquid in the zone 37, liquid from the zones 32 and 37, respectively, being recombined for re-use after conclusion of the respective operations of centrifugation and discharge from the rotor.

Figure 2 of the drawings illustrates the practice of the invention by a somewhat modified process. In accordance with this embodiment of the invention, liquid removed from the reservoir R is divided into two bodies or streams before being subjected to centrifugation. One of such bodies or streams, which may comprise the major portion of the liquid to be treated, is passed through a zone of centrifugation C where it is subjected to centrifugation at high capacity, for the purpose of removing the coarser impurities. The second body or stream of liquid, which may constitute but a minor proportion of the liquid removed from the reservoir R, is subjected to more intensive centrifugation in the zone C', before being recombined with the first separated body or stream of liquid. The step of centrifugation C' removes both the coarse and the fine impurities from the body of liquid passed to this step, while the centrifugation step C removes the coarser impurities from the liquid on which it is practiced.

Figure 5 illustrates a centrifugal rotor designed to practice the process of Figure 2 of the drawings. The liquid to be subjected to centrifugation is divided into two streams. The first stream is fed to a lower zone of centrifugation 51 of the rotor 50, through a central feed tube 52. Passages 53 may be provided for discharge of separated liquid from this zone of the rotor, if material containing a liquid impurity is under treatment. Purified liquid may be discharged from the zone 51 of the rotor through passages 54 in the central portion of the rotor communicating with the inner portion of this zone. The second portion of the liquid under treatment, which may comprise a minor proportion, is fed through passages 55 into a zone of centrifugation 56, which may be divided from the zone of centrifugation 51 by a partition 57. This body of liquid is subjected to more prolonged centrifugation than the body passed to the zone 51, by being retained in the zone 56 for a longer period of time than the liquid under treatment in zone 51 is retained in that zone. This result may be attained by passing less liquid to the zone 56 than to the zone 51, by making the zone 56 of larger size than the zone 51, or by a combination of these expedients. In any case, a relatively thoroughly purified liquid is discharged from the zone 56 and from the rotor through space 58, and the streams of liquid discharged from the zone 51 and from the zone 56 may thereafter be recombined for re-use, as illustrated in Figure 2 of the drawings.

Modifications will be obvious to those skilled in the art, and I do not therefore wish to be limited except by the scope of the following claims.

I claim:

1. In the centrifugal purification of liquids, the process comprising subjecting the liquid to be purified to centrifugation to remove impurities therefrom, dividing the centrifugally purified liquid into two portions of similar centrifugally purified liquid, subjecting one of said divided portions to further and more rigorous centrifugation to remove therefrom impurities of more difficultly removable type not removed in said first centrifugation, and thereafter combining said liquid which has been subjected only to said first step of centrifugation with said liquid which has been subjected to said further step of centrifugation.

2. In the centrifugal purification of liquids, the process comprising subjecting the liquid to be purified to centrifugation to remove impurities therefrom, dividing the centrifugally purified liquid into two portions of similar centrifugally purified liquid, subjecting one of said divided portions to a second, and more prolonged step of centrifugation than said first-mentioned centrifugation step to remove therefrom impurities of more difficultly removable type not removed in said first centrifugation, and thereafter combining said liqiud which has been subjected only to said first step of centrifugation with said liquid which has been subjected to said further step of centrifugation.

3. In the centrifugal purification of liquids, the process comprising subjecting the liquid to be purified to centrifugation in a zone of a centrifugal rotor to remove impurities therefrom, removing a part of the centrifugally purified liquid from said zone and from said centrifugal rotor, passing a second, and similar, part of said centrifugally purified liquid into a second zone of centrifugation in said centrifugal rotor, subjecting said second part of said liquid to further and more rigorous centrifugation in said second zone to remove therefrom impurities of more difficultly removable type not removed in said first zone, and thereafter combining said liquid which has been discharged from the first zone of said centrifugal rotor and from said rotor, with liquid purified additionally in said second zone of said centrifugal rotor.

4. In a centrifugal separator, the combination comprising, a centrifugal rotor, a partition dividing said rotor into successive centrifugal purifying zones of which each zone is designed for separation of impurities, means for feeding an impure liquid to said centrifugal rotor and into one of said zones, means for rotating said rotor to effect partial removal of impurities by centrifugation of said impure liquid in said first zone, and means for directing a part of said liquid from which partial removal of impurities has been attained in said first zone away from said second zone and from the centrifugal rotor, the space occupied by liquid from which partial removal of impurities has been attained in said first zone communicating with said second zone, whereby a second part of the partially purified liquid in said first zone is passed to said second zone for removal of further impurities therefrom.

5. In a centrifugal separator, the combination comprising, a centrifugal rotor, a partition dividing said rotor into successive centrifugal purifying zones of which each zone is designed for separation of impurities, means for feeding an impure liquid to said centrifugal rotor and into one of said zones, means for rotating said rotor to effect partial removal of impurities by centrifugation of said impure liquid in said first zone, and means for directing a part of said liquid partially purified in said first zone away from said second zone and from the centrifugal rotor, the space occupied by liquid from which partial removal of impurities has been attained in said first zone communicating with said second zone through a restricted opening, whereby a second part of the liquid from which partial removal of impurities has been attained in said first zone is passed to said second zone for removal of further impurities therefrom.

6. In a centrifugal separator, the combination comprising, a centrifugal rotor, a partition dividing said rotor into successive centrifugal purifying zones of which each zone is designed for separation of impurities, means for feeding an impure liquid to said centrifugal rotor and into one of said zones, means for rotating said rotor to effect partial removal of impurities by centrifugation of said impure liquid in said first zone, and means for directing a part of said liquid partially purified in said first zone away from said second zone and from the centrifugal rotor, the space occupied by liquid from which partial removal of impurities has been attained in said first zone communicating with said second zone, whereby a second part of the liquid from which partial removal of impurities has been attained in said first zone is passed to said second zone for removal of further impurities therefrom, the relative sizes of said zones and communication therebetween being designed to afford more prolonged centrifugation of the liquid in said second zone than in said first zone.

7. In a centrifugal separator, the combination comprising, a centrifugal rotor, a partition dividing said rotor into successive centrifugal purifying zones of which each zone is designed for separation of impurities, means for feeding an impure liquid to said centrifugal rotor and into one of said zones, means for rotating said rotor to effect partial removal of impurities by centrifugation of said impure liquid in said first zone, and means for directing a major part of said liquid from which partial removal of impurities has been attained in said first zone away from said second zone and from the centrifugal rotor, the space occupied by liquid from which partial removal of impurities has been attained in said first zone communicating with said second zone, whereby a second part of the partially purified liquid in said first zone is passed to said second zone for removal of further impurities therefrom.

8. In the centrifugal purification of liquids, the process comprising subjecting the liquid to be purified to centrifugation to remove impurities therefrom by dividing said body of liquid, subjecting a portion of said body of liquid to centrifugation in a zone of a centrifugal rotor to remove a portion of the impurities therefrom, subjecting the other divided part of the body of liquid to a substantially more rigorous centrification in another zone of said same centrifugal rotor simultaneously with the centrification of said first-mentioned portion to remove a larger proportion of impurities therefrom, and thereafter combining said purified bodies of liquid.

9. In the centrifugal purification of liquids contaminated in use, the process comprising subjecting the liquid to be purified to centrifugation to remove impurities therefrom, dividing the centrifugally purified liquid into two portions of similar centrifugally purified liquid, subjecting one of said divided portions to further and more rigorous centrifugation to remove therefrom impurities of more difficultly removable type not removed in said first centrifugation, and thereafter combining said liquid which has been subjecteed only to said first step of centrifugation with said liquid which has been subjected to said further step of centrifugation, returning said combined liquids to the zone of use, and subjecting the liquid resulting from said use to a repetition of the steps defined above after a continued period of use.

10. In the centrifugal purification of liquids, the process comprising subjecting a relatively large flow of the liquid to be purified to a relatively less rigorous centrifugation in a zone of a centrifugal rotor for the removal of relatively easily removed impurities and subjecting a divided relatively small flow of the liquid to be purified to a relatively substantially more rigorous centrifugation in a separate zone of the same centrifugal rotor in order to remove impurities that are relatively more difficult to remove.

11. In the centrifugal purification of liquids, the process comprising subjecting the entire body of liquid to be purified to centrifugation in a single centrifugal rotor to remove impurities therefrom by steps including subjecting a portion of said liquid to treatment in said centrifugal rotor to remove a larger proportion of impurities than is removed from the remainder thereof, by dividing said body of liquid and subjecting a divided portion thereof to centrifugation in a zone of said centrifugal rotor separate from that in which the remainder is centrifugally purified, the centrifugation of said portion in said separate zone being substantially more rigorous than that of the remainder accomplished in said centrifugal rotor, and thereafter combining said purified bodies of liquid.

12. In the centrifugal purification of liquids contaminated in use, the process comprising subjecting a relatively large flow of the liquid to be purified to a relatively less rigorous centrifugation in a zone of a centrifugal rotor for the removal of relatively easily removed impurities, subjecting a divided relatively small flow of the liquid to be purified to a relatively substantially more rigorous centrifugation in a separate zone of the same centrifugal rotor in order to remove impurities that are relatively more difficult to remove, thereafter combining said liquid which has been subjected to said relatively less rigorous centrifugation with the liquid which has been subjected to said relatively more rigorous centrifugation, returning said combined liquids to the zone of use, and subjecting the liquid resulting from said use to a repetition of the steps defined above after a continued period of use.

13. In the centrifugal purification of liquids contaminated in use, the process comprising subjecting the entire body of liquid to be purified to centrifugation in a single centrifugal rotor to remove the impurities therefrom by steps including subjecting a portion of said liquid to treatment in said centrifugal rotor to remove a larger proportion of impurities than is removed from the remainder thereof, by dividing said body of liquid and subjecting a divided portion thereof to centrifugation in a zone of said centrifugal rotor separate from that in which the remainder is centrifugally purified, the centrifugation of said portion in said separate zone being substantially more rigorous than that of the remainder accomplished in said centrifugal rotor, thereafter combining said purified bodies of liquid and returning said combined liquids to the zone of use, and subjecting the liquid resulting from said use to a repetition of the steps defined above after a continued period of use.

14. In the centrifugal purification of liquids contaminated in use, the process comprising subjecting a relatively large flow of the liquid to be purified to a relatively less rigorous centrifugation for the removal of relatively easily removed impurities, subjecting a divided relatively small flow of the liquid to be purified to a relatively substantially more rigorous centrifugation in order to remove impurities that are relatively more difficult to remove, thereafter combining said liquid which has been subjected to said relatively less rigorous centrifugation with the liquid which has been subjected to said relatively more rigorous centrifugation, returning said combined liquids to the zone of use, and subjecting the liquid resulting from said use to a repetition of the steps defined above after a continued period of use.

15. In the use and centrifugal purification of lubricating oil, the process comprising subjecting a relatively large flow of used lubricating oil to be purified to a relatively less rigorous centrifugation for the removal of relatively easily removed impurities, subjecting a divided relatively small flow of said oil to be purified to a relatively substantially more rigorous centrifugation in order to remove impurities that are relatively more difficult to remove, thereafter combining oil which has been subjected to said relatively less rigorous centrifugation with oil which has been subject to said relatively more rigorous centrifugation, returning said combined bodies of oil to the zone of use, and subjecting the oil resulting from said use to a repetition of the steps defined above after a continuous period of use.

LAURENCE PRICE SHARPLES.